United States Patent
Rebhan et al.

(10) Patent No.: US 6,641,414 B2
(45) Date of Patent: *Nov. 4, 2003

(54) SYSTEM OF DEVICES FOR SIGNAL TRANSMISSION BETWEEN TWO TERMINALS

(75) Inventors: Helmut Rebhan, Weiden (DE); Alexander Steinert, Floss (DE)

(73) Assignee: Nexans, Paris (FR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/734,683

(22) Filed: Dec. 13, 2000

(65) Prior Publication Data

US 2001/0012713 A1 Aug. 9, 2001

(30) Foreign Application Priority Data

Dec. 14, 1999 (DE) .......................................... 199 60 205

(51) Int. Cl.[7] .............................................. H01R 35/04
(52) U.S. Cl. ........................................................ 439/164
(58) Field of Search .................................... 439/164, 15

(56) References Cited

U.S. PATENT DOCUMENTS

| 4,921,428 | A | * | 5/1990 | Sasaki et al. | ............... | 439/164 |
| 5,100,331 | A | * | 3/1992 | Banfelder | ................... | 439/164 |
| 5,137,463 | A | | 8/1992 | Sasaki et al. | | |
| 5,813,875 | A | * | 9/1998 | Ishikawa et al. | ............ | 439/164 |

FOREIGN PATENT DOCUMENTS

| DE | 43 29 119 A1 | 3/1995 |
| DE | 295 10 286 U1 | 10/1995 |
| EP | 0 243 047 A2 | 10/1987 |
| EP | 0 401 028 A2 | 12/1990 |
| EP | 0 417 350 A1 | 3/1991 |

* cited by examiner

*Primary Examiner*—Gary Paumen
(74) *Attorney, Agent, or Firm*—Sughrue Mion, PLLC

(57) ABSTRACT

A device for signal transmission between two terminals, having at least one cable (10) accommodated in an essentially circular cartridge (K) and positioned between the terminals. At least one of the two terminals is movable relative to the other. The cartridge (K) comprises a rotor (15) rotatable around its axis (A) and a fixed stator (16), which together delimit an acceptance space (17) serving to accept the cable (10). To allow the utilization of cables (10) of varying widths, a compensation body (18) with variable axial height is applied to at least one of the surfaces of the rotor (15) or stator (16) bordering the acceptor space (17). For a constant axial height (H) of the acceptor space (17) of the cartridge (K) and a variable axial height of the cable (10), the axial height of the compensation body (18) is dimensioned in such a way that the free space remaining between the cable (10) and the rotor (15) and/or stator (16) of the cartridge (K) in the axial direction is essentially filled by the compensation body (18).

11 Claims, 5 Drawing Sheets

SYSTEM OF DEVICES FOR SIGNAL TRANSMISSION BETWEEN TWO TERMINALS

BACKGROUND OF THE INVENTION

This application is based on and claims the benefit of German Patent Application No. 199 60 205.0 filed Dec. 14, 1999, which is incorporated by reference herein.

The present invention relates to a device for signal transmission between two terminals having at least one cable, positioned between them and accommodated in an essentially circular cartridge, from which further cables can be attached to the two terminals and whose length is greater than the distance of the two terminals from one another, in which device at least one of the two terminals is movable relative to the other and in which the cartridge consists of a rotor rotatable around its axis and a fixed stator which delimit an acceptor space serving to accept the cable, as described in published European patent application no. EP 0 417 350 A1.

This type of device is, for example, used for the transmission of a signal to activate the airbag of an impact protection system for motor vehicles, but is also used for sliding door cabling or steering mechanism cabling of motor vehicles. For this purpose the device is, as a rule, housed in the steering wheel of a motor vehicle for transmission of an electrical or optical signal. "Cable" in the sense of the invention can thus be an electrical or optical cable. An essential problem for this device is signal transmission between fixed and movable parts of the motor vehicle. The sliding contacts and/or slip rings serving for current transmission, which have been long known for such cases, are subject to abrasion and are particularly disadvantageous at low current intensities due to the fluctuating transmission resistances.

In the known device according to the above-mentioned European patent application EP 0 417 350 A1, electrical current is used for signal transmission. The current transmission occurs through, e.g., a flat ribbon cable wound into a wound package like a spring barrel—referred to as "FRC" hereinafter. During relative rotational movement of the two terminals connected by the FRC, the wound FRC "breathes" like the spring of a clock. The windings of the wound FRC are compressed to a smaller diameter in one rotational direction. In the other rotational direction, they open back up to a larger diameter. The windings of the FRC thereby rub on the bordering surfaces of the stator and rotor.

In the FRC accommodated in the cartridge of such devices, two or more conductors are positioned at a distance from one another. The width of the FRC thus increases as the number of conductors increases if the electrical properties of the FRC, particularly the ohmic resistance, are to remain unchanged for a constant length of FRC. Because the cable is inserted in the acceptor space of the cartridge edgewise, the word "height" will be used instead of the word "width," meaning the axial height of the mounted cable in the acceptor space of the cartridge. The dimensions of the cartridge according to the previously mentioned EP 0 417 350 A1 are selected for the use of a cable with a fixed number of conductors. This is also true for all other known cartridges. If a different number of conductors is necessary than is present in the cable provided, either the dimensions of the cartridge must be adapted to a correspondingly shorter or taller cable, or only a part of the conductors present in a suitable cable will be used. Both variants are costly.

SUMMARY OF THE INVENTION

It is an object of the invention to provide a device of the type initially described which is usable, within wide limits, for FRC's with any desired number of conductors.

This and other objects of the invention are achieved by a signal transmission device wherein:

a compensation body with variable axial height is applied to at least one of the surfaces of the rotor and stator bordering on the acceptor space and for a constant axial height of the acceptor space of the cartridge and a variable axial height of the FRC, the axial height of the compensation body is dimensioned in such a way that the free space remaining between the FRC and the rotor and/or stator of the cartridge in the axial direction is essentially filled by the compensation body.

With this device, a cartridge with constant dimensions—particularly those of the acceptor space for the FRC—can be used for many different requirements. The number of conductors of the particular FRC to be used can thus be advantageously adapted to the particular application. Therefore, FRC's of varying heights can be used. The axial free space within the acceptor space of the cartridge, which is therefore variable, is filled out for any application by a compensation body of a matching height. The sum of the axial height of the FRC and compensation body remains essentially constant in all cases. The FRC therefore cannot move in the axial direction by enough to stress the contact points, even if the height of the FRC is small in relation to the height of the acceptor space. Tangling of individual windings of the FRC is also thus prevented. The specific matched compensation body can also always assume a muffling function in addition to its function as a height compensator if suitable materials are used.

BRIEF DESCRIPTION OF THE DRAWINGS

Exemplary embodiments of the invention are shown in the drawings, wherein.

DETAILED DESCRIPTION OF THE INVENTION

The invention is described below in the context of a cartridge—also representing other embodiments—in which a flat ribbon cable (FRC) with electrical conductors is mounted. However, instead of the FRC, a cable with at least one optical conductor could also be used. A combined cable with electrical and optical conductors could also be used.

Figure 1:
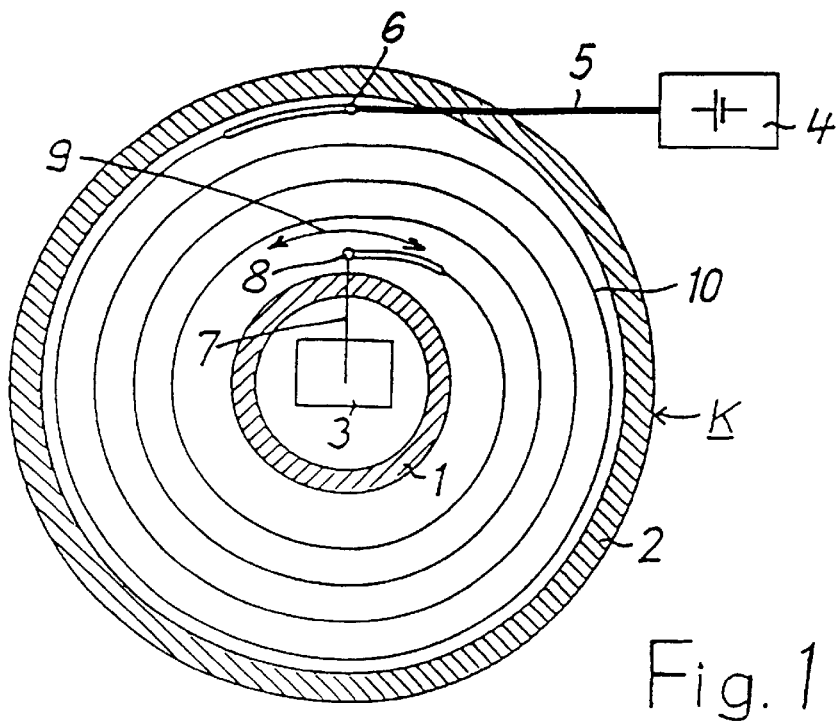
FIG. 1 shows a view of a cartridge with a device according to the invention in schematic view.

In FIG. 1, two, e.g., circular walls 1 and 2 of a cartridge K, which is intended for installation in the steering wheel of a motor vehicle, are schematically depicted. The cartridge K is connected to a battery 4 of the motor vehicle in order to provide current to an electronic device 3 whose signal can trigger an airbag. The battery 4 is connected via an electrical cable 5 with a terminal 6 of the cartridge K realized as a fixed point. The electronic device 3 is connected via an electrical cable 7 to a terminal 8 of the cartridge K which is movable in the direction of the double arrow 9. In principle, the terminal 8 could also be realized as fixed and the terminal 6 as movable. Both terminals 6 and 8 could also be movable.

An FRC 10 with at least two electric conductors is mounted between the two terminals 6 and 8. The conductors are preferably realized as flat conductors. This embodiment of the FRC 10 is particularly thin and therefore occupies very little space. In principle, the FRC 10 could, however, also have round conductors. The design of the FRC 10 and the type of its connection and/or termination to the terminals 6 and 8 are not depicted in more detail. They are known in principle in different variants and are not significant here.

The FRC 10 can be positioned in the cartridge K between the two terminals 6 and 8 in several windings, i.e., like the spring barrel of a clock, in accordance with FIG. 1. Although a steering wheel is limited to approximately six rotations, more than six windings should be provided for the FRC 10. The rotational movement of the terminal 8 is thus not substantially noticeable for one individual winding of the FRC 10. The diameter of the wound package consisting of all of the windings of the FRC 10 is merely increased or decreased.

Figure 2:
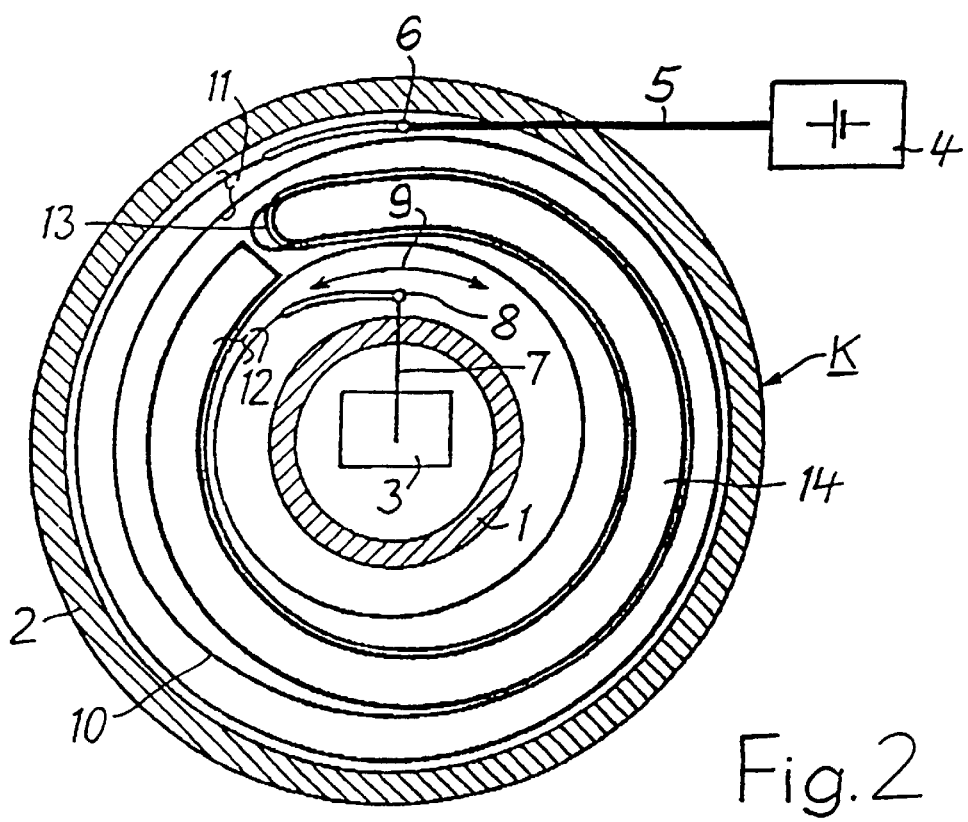
FIG. 2 shows an embodiment of the cartridge which is a variation of FIG. 1.
Figure 3:
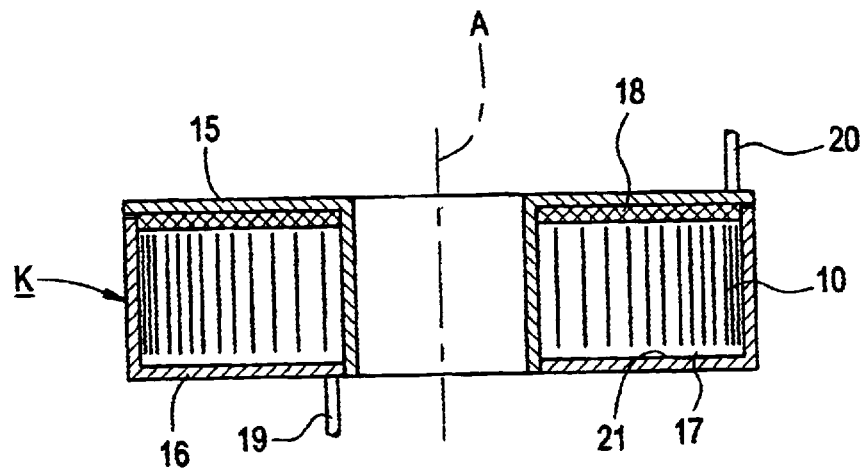
FIG. 3 shows a cross-section through the cartridge in enlarged view.

The FRC 10 can also be positioned in the cartridge K in windings which are divided into an outer wound region 11 and an inner wound region 12, in accordance with FIG. 2. The two wound regions 11 and 12 are indicated by brackets. In the center position visible in FIG. 2 and/or in the assembly position of the cartridge K, they each enclose two to three windings. The windings of the FRC 10 have opposite winding directions in the two wound regions 11 and 12. The winding regions 11 and 12 are connected to one another through an approximately U-shaped reversal location 13. A one-piece annular guiding body 14, which encloses the reversal location 13, is mounted between the two wound regions 11 and 12. The guiding body 14 can be rotated around its center and is slightly movable in the direction of the circumference of the cartridge K, i.e., in the direction of the double arrow 9. It can be realized as a closed ring with a passage for the reversal location 13 of the FRC 10. It can, however, also be an open ring which extends over nearly 360°, as it is depicted in FIG. 3. The guiding body 14 preferably consists of plastic. It is thereby very light, so that it can be easily moved in the cartridge K.

The cartridge K consists, according to FIG. 3, of a rotor 15 and a stator 16. The rotor 15 is rotatable relative to the stator 16 around the axis A of the cartridge K. For this purpose, it is, for example, connected with the steering wheel of a motor vehicle in whose steering column the cartridge K is installed. The FRC 10 and a compensation body 18, which is applied in the exemplary embodiment depicted as a one-piece body to the rotor 15, are located in the acceptor space 17 enclosed by the rotor 15 on one hand and the stator 16 on the other hand. Continuing electrical cables 19 and 20 leading out of the cartridge K are connected to the ends of the FRC 10.

During a rotation of the rotor 15, the FRC 10 and/or its windings are moved transversely to the axis A of the cartridge K. There is therefore an adequately large gap between the FRC 10 and the compensation body 18 to ensure that the FRC 10 is not pinched. During the movement of the FRC 10, its windings slide across the inner surface 21 of the stator 16. The surface 21 can be coated with a muffling material, for example a nonwoven material consisting of fibers.

Figure 4:
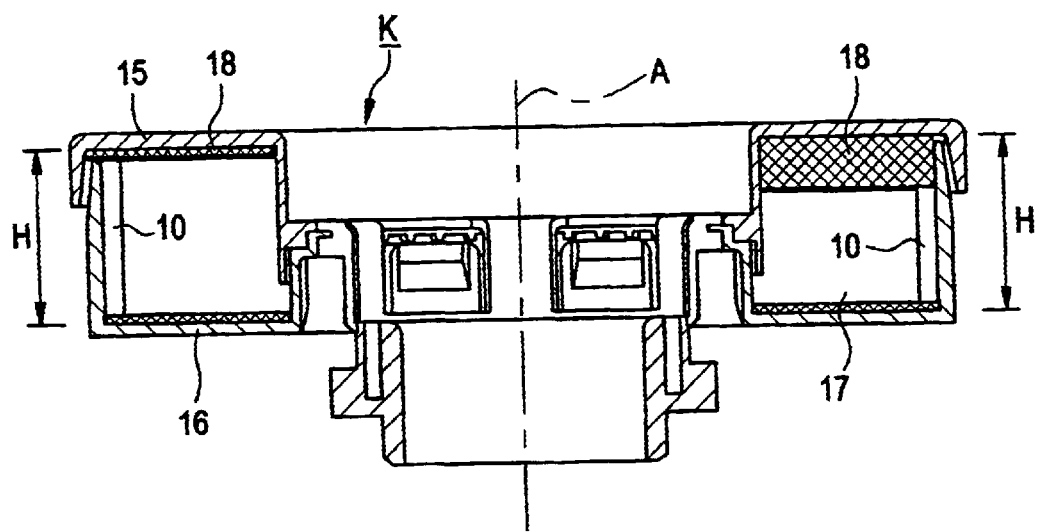
FIG. 4 shows a detail from FIG. 3 in further enlarged view.

The axial height H of the acceptor space 17 of the cartridge K is to remain unchanged, independent of the axial height of the FRC 10. If the FRC 10 is tall due to a correspondingly large number of conductors (left side of FIG. 4), then a correspondingly thinner compensation body 18 with a smaller axial height is used. For a shorter FRC 10 (right side of FIG. 4), an axially taller compensation body 18 is used. The axial height of the compensation body 18 is dimensioned in such a way that the remaining axial free space in the acceptor space 17 of the cartridge K with the FRC 10 inserted is essentially filled up by the compensation body 18. The sum of the axial heights of the FRC 10 and the compensation body 18 is thus approximately constant in all cases. Enough free space always remains between the compensation body 18 and the surface 21 of the cartridge K that the FRC 10 can move between them.

Figure 5:
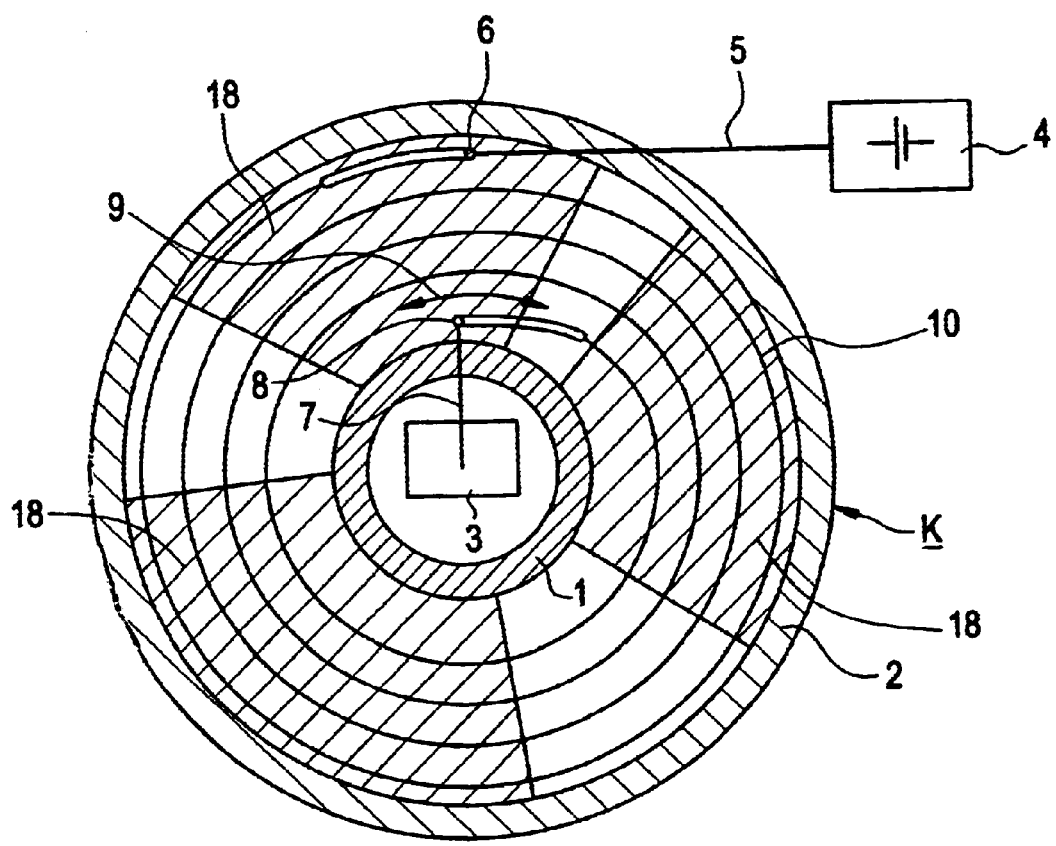
FIG. 5 illustrates an alternative preferred embodiment of the present invention, including ring segments as the compensation body.
Figure 6:
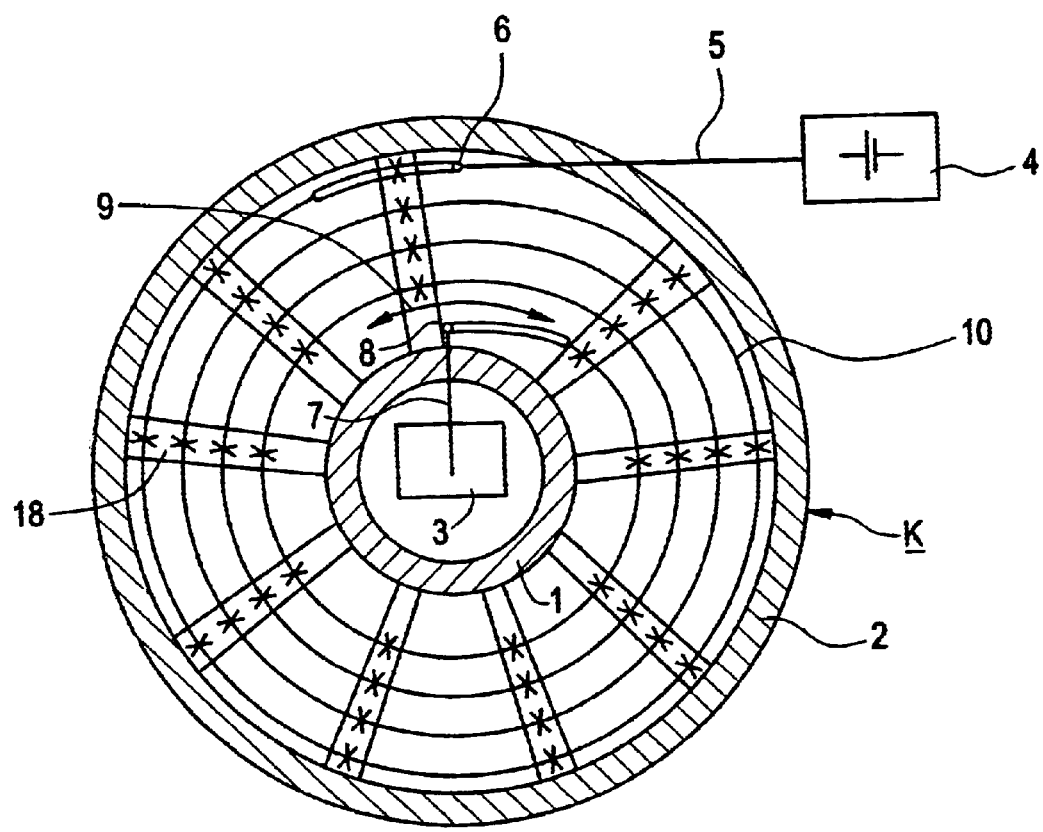
FIG. 6 illustrates another alternative preferred embodiment of the present invention, including ribs as the compensation body.
Figure 7:
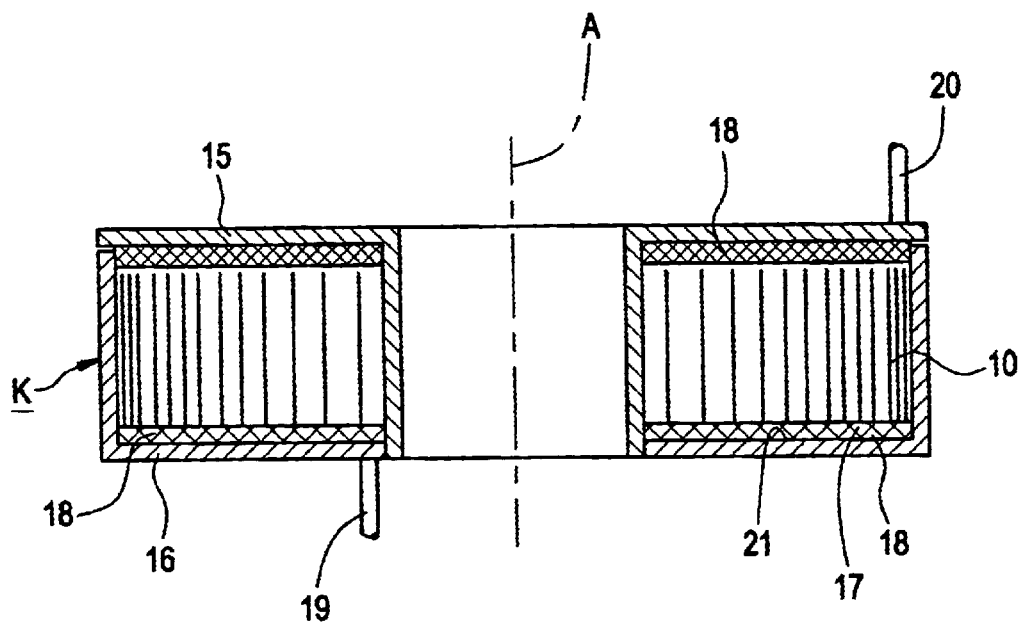
FIG. 7 illustrates yet another alternative preferred embodiment of the present invention, including the compensation body divide into two partial bodies, one of which is applied to the stator and the other to the rotor.

As illustrated in FIGS. 5–7 and described in greater detail below, the present invention may be realized in alternative embodiments. For example, but not by way of limitation, FIG. 5 illustrates the compensation body 18 as ring segments, and FIG. 9 illustrates the compensation body 18 as ribs. Further, FIG. 7 illustrates the compensation body divided into two partial bodies, one of which is applied to the stator 16, and the other of which is applied to the rotor 15.

In the exemplary embodiment depicted, the compensation body 18 is mounted as a one-piece body on the rotor 15. It could, however, also be mounted on the stator 16. A division of the compensation body 18 into two partial bodies is also possible, with one mounted on the rotor 15 and the other on the stator 16.

What is claimed is:

1. A system of devices for signal transmission between two terminals, each of said devices comprising:
at least one flat ribbon cable (FRC) with a prescribed number of conductors and having a corresponding height, said at least one ERG being positioned between the two terminals and accommodated in a circular cartridge, from which additional cables are attached to the two terminals, said at least one ERG having a length greater than a distance between the two terminals,
wherein in said each of said devices one of the two terminals is movable relative to the other, and the cartridge comprises,
a fixed stator and a rotor rotatable round a common axis, and
wherein the rotor and the fixed stator each have surfaces bordering an acceptor space configured to accept the at least one FRC, and
further wherein:
in said each of said devices, independent of said height of the at least one FRC, the cartridge has unchanged outer and inner dimensions for a constant height of the acceptor space, a compensation body having variable height is applied within the acceptor space to at least one of said rotor and said fixed stator, and
for a variable axial height of the FRC, the axial height of the compensation body is dimensioned such that the respective height of the FRC and the corresponding compensation body together is constant and corresponds to the total axial height of said acceptor space.

2. The system of claim 1, wherein the compensation body comprises a one-piece ring.

3. The system of claim 1, wherein the compensation body is interrupted around its circumference and comprises ring segments.

4. The system of claim 1, wherein the compensation body comprises ribs running in the radial direction of the cartridge.

5. The system of claim 1, wherein the compensation body is applied in one piece to one of the fixed stator and the rotor.

6. The system of claim 1, wherein the compensation body is divided into two partial bodies, one of which is applied to the fixed stator and the other to the rotor.

7. The system of claim 1, wherein the compensation body comprises a muffling material.

8. The system of claim 1, wherein said cartridge in each of said devices has identical dimensions.

9. A system of devices for signal transmission between two terminals, each of said devices comprising:

a cable with a conductor and having a corresponding height, said cable positioned between the two terminals and accommodated in a circular cartridge, from which additional cables are attached to the two terminals, said cable having a length greater than a distance between the two terminals, wherein in said each device, one of the two terminals is movable relative to the other, and the cartridge comprises, a rotor rotatable around its axis, and a fixed stator, wherein the rotor and the fixed stator each have surfaces bordering an acceptor space configured to accept the cable, and further wherein:

in said each device, independent of said height of the cable, the cartridge has unchanged dimensions for a constant height of the acceptor space, a compensation body is applied within the acceptor space to at least one of said rotor and said fixed stator, and for a variable axial height of the cable, the compensation body is dimensioned such that dependent on the height of the cable, said acceptor space between the cable and the bordering surface of the rotor or stator is filled by the compensation body.

10. The system of claim 9, wherein said conductor comprises at least one optical conductor.

11. The system of claim 9, wherein said conductor comprises an optical conductor and an electrical conductor.

* * * * *